May 6, 1924.
X. SCHÖNMETZLER
MOWING MACHINE
Filed July 24, 1922
1,492,652
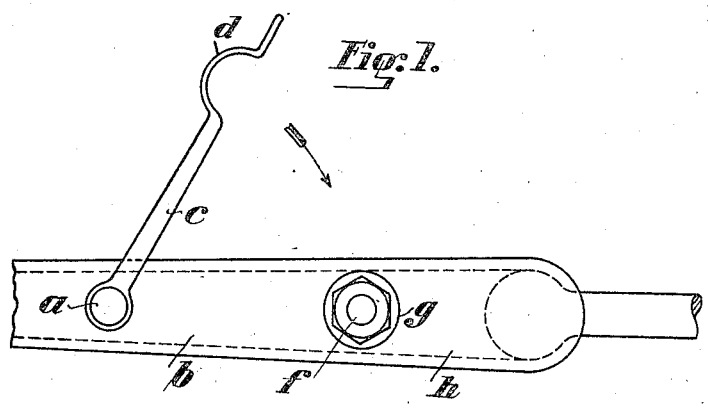
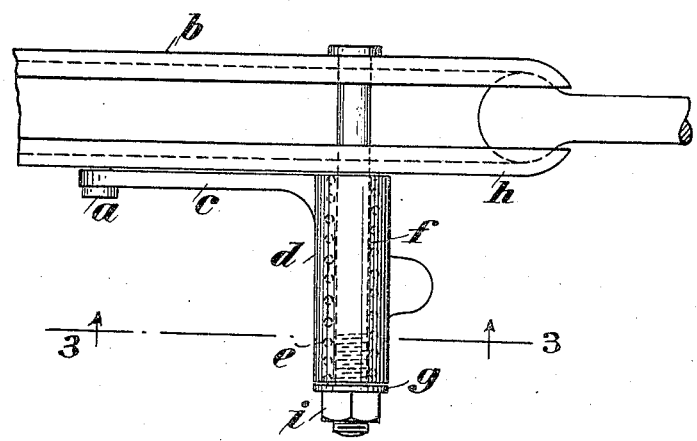
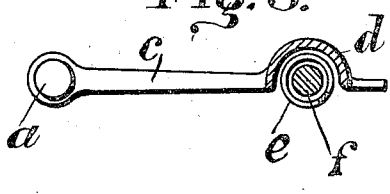
Inventor
Xaver Schönmetzler
By Henry Orth Jr
atty.

Patented May 6, 1924.

1,492,652

UNITED STATES PATENT OFFICE.

XAVER SCHÖNMETZLER, OF MEMMINGEN, BAVARIA, GERMANY, ASSIGNOR TO AMBI-ARTHUR MÜLLER BAUTEN UND INDUSTRIEWERKE, OF BERLIN, GERMANY.

MOWING MACHINE.

Application filed July 24, 1922. Serial No. 577,102.

*To all whom it may concern:*

Be it known that I, XAVER SCHÖNMETZLER, a citizen of Germany, residing at Memmingen, Bavaria, Germany, have invented certain new and useful Improvements in and Relating to Mowing Machines, of which the following is a specification.

This invention relates to mowing machines and is more particularly applicable to that kind of mowing machine in which a ball joint connection is arranged between the driving bar and the cutting apparatus.

In the arrangement referred to as usually employed a screw bolt is passed through a hole in the two spring connected members of the driving bar which enclose between them the ball joint carried by a part fixed to the cutting apparatus, and this screw bolt is usually surrounded by a spiral spring adapted to be pressed against one of the members of the driving bar by means of a nut and washer screwed on to the outer end of the screw bolt. In the arrangement heretofore employed it has been found that when the mowing machine becomes somewhat choked with grass or the like after being in use for some time, the ball joint connection between the driving bar and the cutting apparatus is not sufficiently resistant to support the strain.

The object of the invention is to provide an improved ball joint connection of the kind referred to by means of which the above indicated disadvantage is removed.

In the improved ball joint connection of the kind referred to above according to my invention the driving bar is provided with a rigid fixing device adapted to be inserted between the nut screwed on the end of the bolt, or the washer in connection therewith, and one of the members of the driving bar.

In order that the nature of the invention may be clearly understood an arrangement embodying the same will now be described by way of example with the aid of the accompanying drawings in which—

Fig. 1 is a side view,

Fig. 2 a plan and Fig. 3 is a cross section on the line 3—3 of Fig. 2.

Referring to the drawings, the driving bar of the mowing machine is shown at $b$ on one member $h$ of which an arm $c$ is pivotally supported on the pivot pin $a$. At the free end of the arm $c$ a semicircular casing $d$ is formed or fixed adapted to be folded down over the bolt $f$ which is surrounded in the known manner by a spiral spring $e$. By rotating the arm $c$ downwards from the position shown in Fig. 1 into that shown in Fig. 2 the casing $d$ is brought between the washer $g$ and the member $h$ of the driving bar $b$, in which position, as will be seen from Fig. 2, the semi-circular casing $d$ partly surrounds the spiral spring $e$.

With the casing $d$ in this operative position, by tightening the nut $i$ on the screw bolt $f$ a rigid fixing of the two members of the driving bar $b$ is obtained so that the connection between the driving bar and the ball joint carried by the cutting apparatus is sufficiently rigid to sustain even abnormal strains upon the joint connection.

I claim:

In a mowing machine the combination with cutting apparatus and a driving bar, consisting of two spring connected members operatively connected to the cutting apparatus by a ball joint, of a screw bolt passing through the two members of the driving bar, a coil spring surrounding the screw bolt on the outside of one of the members of the driving bar, a nut on the end of the screw bolt for compressing the said spring and securing a yielding connection between the driving bar and the said ball joint, a fixing device in the form of a semi-circular casing mounted on an arm pivoted to one member of the driving bar for insertion between the said member and the nut on the screw bolt to enable an unyielding connection between the driving bar and the ball joint to be obtained at will.

In testimony whereof I have signed this specification in the presence of two witnesses.

XAVER SCHÖNMETZLER.

Witnesses:
ALEXANDER DE SOTO,
ALEXEI PHILIPPOFF.